United States Patent [19]

Intrater et al.

[11] 4,426,423

[45] * Jan. 17, 1984

[54] CERAMIC, CERMET OR METAL COMPOSITES

[75] Inventors: Josef Intrater, Englewood Cliffs, N.J.; Gene Bertoldo, New York, N.Y.

[73] Assignee: Advanced Technology Inc., Palisades Park, N.J.

[*] Notice: The portion of the term of this patent subsequent to Nov. 9, 1999 has been disclaimed.

[21] Appl. No.: 415,502

[22] Filed: Sep. 10, 1982

Related U.S. Application Data

[63] Continuation-in-part of Ser. No. 315,452, Oct. 27, 1981, Pat. No. 4,376,806, Ser. No. 268,015, May 28, 1981, Pat. No. 4,374,903, Ser. No. 242,716, Mar. 11, 1981, Pat. No. 4,396,677, and Ser. No. 200,514, Oct. 24, 1980, Pat. No. 4,358,506.

[51] Int. Cl.³ .................... B32B 15/04; B05D 5/12
[52] U.S. Cl. .................... 428/408; 427/113; 428/469; 428/698; 428/699; 428/701
[58] Field of Search ............ 428/469, 408, 698, 699, 428/701; 427/113

[56] References Cited

U.S. PATENT DOCUMENTS

| | | | |
|---|---|---|---|
| 1,098,794 | 6/1914 | Fleming | 427/113 X |
| 2,866,724 | 12/1958 | Alexander | 427/113 X |
| 3,860,443 | 1/1975 | Lachman et al. | 427/113 X |
| 4,358,506 | 11/1982 | Intrater et al. | 428/408 |
| 4,374,903 | 2/1983 | Intrater et al. | 428/469 X |

*Primary Examiner*—Thomas J. Herbert, Jr.
*Attorney, Agent, or Firm*—Fred A. Keire

[57] ABSTRACT

This invention relates to nitrides, oxides, arsenides, borides, phosphides, tellurides, titanates, silicides, carbides, etc. of metals or metalloids, such as or in their compacted forms, as substrates or base elements. These can be readily joined with various other substrates employing as a coating, film, layer or interlayer former a tin, lead, indium, or alloys thereof, in an admixture with a carbide or carbonyl former and joining the substrate or base in a carbon monoxide atmosphere with the coating, etc. former.

29 Claims, No Drawings

CERAMIC, CERMET OR METAL COMPOSITES

This application is a continuation-in-part of our previously filed application Ser. No. 200,514 filed Oct. 24, 1980, now U.S. Pat. No. 4,358,506 issued Nov. 9, 1982; Ser. No. 242,716 filed Mar. 11, 1981, now U.S. Pat. No. 4,396,677 issued Aug. 2, 1983; Ser. No. 268,015 filed May 28, 1981, now U.S. Pat. No. 4,374,903 issued Feb. 23, 1983, and Ser. No. 315,452 filed Oct. 27, 1981, now U.S. Pat. No. 4,376,806 issued Mar. 15, 1983.

This invention relates to nitrides, oxides arsenides, borides, phosphides, tellurides, titanates, silicides, carbides, etc. of metals or metalloids, as such or in their compacted forms, as substrates or base elements. These can be joined with various other substrates employing as a coating, film, layer or interlayer former a tin, lead, indium, or alloys thereof, in an admixture with a carbide or carbonyl former and joining the substrate or base in a carbon monoxide atmosphere with the coating, etc. former.

In our above-identified applications, we have disclosed various substrates and alloy combinations found to be especially useful for producing outstandingly adherent coatings of tin, lead, indium, or alloys thereof, in admixture with carbide or carbonyl formers to substrates recited in those previous applications. Our process is based on subsequent discoveries made during the utilization and investigation of the various aspects of our previously disclosed inventions and has been found to be especially useful, in a generic sense, to applications to bases of substrates heretofore known for their extreme difficulty for bonding with different materials and substrates.

As disclosed in our previous application, the combination of the carbide and carbonyl former with tin, lead, indium, or alloys thereof, when the same are properly admixed and then made to join with a substrate in an atmosphere of carbon monoxide, has produced heretofore unknown and completely unforeseen results. This discovery has opened the possibility now to join metals with substrates heretofore most difficult to join with. It has now been found that by practicing the same process on various substrates heretofore incapable of ready production, outstandingly good bonds are obtained which are essentially void free, have great tenacity and no measurable increase in resistance. These can be produced with outstanding yields. This is possible with the base substrate and also because the tin, lead, or indium alloy on the base substrate can be further joined with other bases or substrates or metals in various forms, providing heretofore unknown and novel substrates useful in many applications such as in the electronic industry for purposes of heat dissipation, current transmission, and the like, and producing outstandingly contamination-free, substantially entirely void free (upon microscopic examination) joints between these devices. Other devices such as piezoelectric, e.g. barium titanates and lasing devices, such as based on aluminum gallium arsenide, can now be readily joined and fabricated in a facile manner for useful application and utilization at a fraction of the cost previously necessary for the successful bonding of the substrates to electrically conductive materials or bases or heat transmissive yet electrically insulative bases such as beryllium oxide.

In view of the above, the disclosures in our previous applications are incorporated by reference herein, and need not be repeated. In general, the same atmosphere conditions, as well as the same temperature ranges, apply, and these are established for the substrate at the necessary conditions. Similarly, the residence time at which proper bonding takes place due to the reducing atmosphere of carbon monoxide is established as necessary, but generally falls within the disclosure found in our previous application. The particular temperature and residence time employed is that most suitable for the particular substrates, and mere routine establishment of the necessary conditions are carried out in any event, as it would be done in any industrial installation in which the practice of our invention would be sought to be applied.

Although carbon monoxide is by far the outstanding reducing agent, it can be admixed with other compatible reducing agents. Similarly, it may be diluted with other gases compatible therewith which do not affect the reaction mechanism or reducing nature of carbon monoxide. After the reducing atmosphere has been established and a proper bond formed such as by the substantial absence of voids, the thorough wetting and tight adherence, as discussed previously, the reducing atmosphere may be appropriately removed and another inert atmosphere substituted therefor to cool the formed composite. In the same manner as the follow-up cooling, the start-up heating may be in an inert atmosphere, although preheating of the substrate and the material can likewise be in a reducing gas such as hydrogen. However, far and away the most effective manner has been the joining of substrate, layers, etc. with the tin, lead, indium and/or alloys thereof and the carbide or carbonyl formers in the presence of carbon monoxide which seems to somehow synergistically interact with the substrate tin, etc. and/or the carbide or carbonyl former.

Although the carbide for carbonyl formers have been used in various forms, it has been most advantageously found that these be of fine particle size, beginning with a colloidal all the way up to $\frac{1}{8}$ of an inch in particulate size. These particulates may be dispersed in the tin, etc. metal, such as under conditions conducive thereto by kneading and/or hot forming or like methods; similarly, dispersoids of one in the other in the extremely fine form thereof may be appropriately admixed in a vehicle such as rosin oil or the various Freons which readily evaporate from the dispersion. The dispersion can then be painted on the substrate or applied thereto by silk-screening or printing, depending on the substrate thickness. Thereafter, the material is inserted in the reducing atmosphere as mentioned above under the appropriate conditions. Different patterns may thus be formed on substrates such as conductive paths and the like for forming circuits, etc.

Some of the illustrations of the substrates which have been given in the previous applications can equally well be joined with the heretofore not disclosed substrates in this application. Consequently, the various substrates such as disclosed and claimed herein are now capable of being joined in outstanding and novel combinations useful for the purposes as disclosed herein. Thus, lanthanum boride, $LaB_6$, useful as a very efficient electron emitter used in electron microscopes, can be outstandingly bonded to electrical devices when first coated with tin-vanadium. This substrate may be successfully bonded or coated in an atmosphere of carbon monoxide at approximately 1,000° C. with a composition consisting of about 15 to 2% vanadium, balance tin.

The homogeneous admixture of these powders, their easy dispersability in fine form, and their ready application to the substrate lends these combinations for purpose of application to the various other substrates as recited above. For example, beryllium oxide may readily be joined with lanthanum boride as being the other of the two layers or substrates, with the tin, etc. in admixture with carbide or cabonyl former, e.g. vanadium as the interlayer for the two.

Other equally facile methods for forming films, layers, etc. on and/or for joining with various substrates gallium arsenide or aluminum gallium arsenide have been found when employing the tin and carbide or carbonyl former combinations. Some of these are such as chromium-tin, vanadium-tin, molybdenum-tin, tungsten-tin, iron-tin, titanium-tin, tantalum-tin, manganese-tin, nickel-tin, and cobalt-tin. The percentages of the above combinations have been of about 15 to 2% of the carbide or carbonyl former, balance tin, with the preferred range being from about 10% to about 15% for the carbide or carbonyl former when joined to the gallium arsenide or aluminum gallium arsenide. Similarly to the above, and especially the tin-vanadium combination, it may be easily used to form adherent coatings on silicon, silicon nitride, or silicon oxide, and thus form various layer combinations of the three (besides these in turn may be joined to the other previously cited base(s) or substrate(s)). Besides the above recited carbide or carbonyl formers, admixtures of these can be equally useful. For example, adding 10% nickel to chromium, vanadium, molybdenum, and cobalt admixture consisting of 10 parts of cobalt to 90 parts of tin results in an equally outstanding adhesion to substrates such as tungsten carbide in combination with the substrates as disclosed herein.

Further, gallium phosphide which is used at high frequencies such as for light emitting diodes is coated with tin, indium, lead alloy, with the carbide or carbonyl former with 90% tin, 5% vanadium, and 5% nickel in an atmosphere of carbon monoxide at 900° C. An outstandingly adhesive bond was formed. In a similar manner, using the same proportions as above for tin, etc. with vanadium and nickel, zirconium ortho-silicate by itself and in admixture with magnesium silicates and the two foregoing further in admixture with aluminum silicate have been successfully coated at the same conditions in carbon monoxide with outstanding adhesion characteristics.

In the same manner as discussed above, the various titanates, e.g. barium titanate; silicon nitrides; oxides, e.g. boron oxides, arsenides, silicides, tellurides and the like, have been joined with tin containing carbide or carbonyl formers to substrates such as carbon, e.g. graphite; metals, e.g. stainless steel; oxides, e.g. beryllium oxide, etc.

Based on the process, the composites have excellent mechanical and/or electrical and/or thermal conductivity properties. There is no need to use noble metals, no sputtering is needed, and extremely sound and strong joints are being formed. Temperatures can be adjusted of the various substrates such that elevated temperature requirements can be met heretofore impossible to meet, i.e. in some tailor-made cases i.e. such as then joining to stainless steel, where heretofore these temperature limits could not be achieved.

In general, it has been found that the present process is applicable to all ceramic type of materials, including mixtures of ceramics and metals known as cermets, and the oxides, nitrides, arsenides, titanates, tellurides, silicides, borides, phosphides and the like, including carbides of the metals or metalloids. These have been found to be especially useful as the substrate materials when these, in powder form, have been isostatically compacted in a very strong mass such as under extremely high pressures (in a can of powder and when subjected to a hot isostatic pressure as it is well known in the art).

These substrate or base materials can also be distributed as powders in forms giving fine dispersion with each other or other like forms, either compatible or incompatible but nevertheless strong, and then isostatically compacted to fully dense forms of outstanding properties. Thus, these can be ceramics or cermets (ceramic metal combinations) which thereafter, by means of the tin, etc. and carbide or carbonyl former, may be joined to other metals, ceramics, cermets, and the like. When thereafter so joined as described herein with the tin, lead, indium or alloy forms thereof in admixture with the carbide and carbonyl formers, these substrates have the strong bonds with each other or with other metals and cermets and are employed for the various purposes listed above.

What is claimed is:

1. A composite of tin, lead, indium, a tin alloy, a lead alloy or an indium alloy, as a component, in combination with a carbide or carbonyl former, as an adherent coating, film or layer on a base or substrate of nitride, oxide, arsenide, aluminum gallium arsenide, titanate, silicide, boride, telluride, phosphide, carbide or oxides of metals, metalloids, or compacted forms thereof, which is non-dewettable upon heating and of a zero to negative angle of contact between the adherent coating and said base or substrate and a substantially void free interface between said coating, film, or layer and said base or substrate.

2. The composite as defined in claim 1, wherein the substrate is lanthanum boride, represented as $LaB_6$.

3. The composite as defined in claim 1, wherein the substrate is barium titanate, zirconium ortho silicate magnesium silicate or aluminum silicate or mixtures of these silicates.

4. The composite as defined in claim 1, wherein the substrate is silicon nitride.

5. The composite as defined in claim 1, wherein the substrate is an arsenide.

6. The composite as defined in claim 1, wherein the substrate is a compacted oxide, nitride, boride, arsenide, telluride, phosphide, silicide, titanate or a mixture thereof, of metals, metalloids or mixtures of the two.

7. The composite as defined in claim 1, wherein iron is the carbide or carbonyl former with tin in a ratio of about 5 to 95.

8. The composite as defined in claim 1, wherein the carbide former is chromium.

9. The composite as defined in claim 1, wherein the carbide former is vanadium.

10. The composite as defined in claim 1, wherein the carbonyl former is nickel in admixture with vanadium.

11. The composite as defined in claim 1, wherein the tin alloy is a tin-lead alloy.

12. The composite as defined in claim 1, wherein the carbide or carbonyl former is chromium, titanium, hafnium, zirconium, cobalt, iron, nickel, manganese, rhenium, ruthenium, rhodium, osmium, iridium, vanadium, niobium, tantalum, tungsten or molybdenum, or mixtures of same.

13. The composite as defined in claim 12, wherein the carbide or carbonyl former is from 15% to 2% chromium, vanadium, molybdenum, tungsten, iron, titanium, tantalum, manganese, nickel or cobalt or mixtures of the foregoing, balance tin or indium or alloys thereof.

14. The composite as defined in claim 1, wherein the base structure is gallium arsenide or gallium phosphide.

15. The composite as defined in claim 14, wherein the base structure is aluminum gallium arsenide.

16. The composite as defined in claim 1, wherein said alloy is an indium alloy.

17. The composite as defined in claim 16, wherein said indium is admixed with vanadium.

18. The composite as defined in claim 1, wherein the same comprises, further, an overlay on said coating, film or layer on said substrate of one of the substrate materials, or a metal alloyable with said coating, film or layer on said base substrate.

19. The composite as defined in claim 18, wherein the overlay is copper on a tin-chromium-arsenide composite.

20. The composite as defined in claim 18, wherein the overlay is an arsenide.

21. The composite as defined in claim 18, wherein said base substrate is gallium arsenide, and the coating is of tin and vanadium and the overlay is beryllium oxide.

22. The composite as defined in claim 18, wherein said base structure is lanthanum boride and said overlay is beryllium oxide.

23. The composite as defined in claim 18, wherein the same is a sandwich of beryllia on which there is a coating, layer or film of tin-vanadium, and an overlay of gallium arsenide or aluminum gallium arsenide.

24. As an alloy, a carbide or carbonyl former, in a metal form, with a "tin group" metal of tin, a tin alloy, lead, a lead alloy, indium, or an indium alloy, in a ratio of 1% to 40% of said carbide or carbonyl former, balance said tin group metal, whereby said alloy is characterized by forming in a carbon monoxide atmosphere a layer on a substrate as defined in claim 1, with zero or negative angle of contact upon heating and melting the same on said substrate, and non-dewetting upon repeated heat cycling.

25. The alloy as defined in claim 24, wherein the same is chromium-tin in the range of 5 to 15%, chromium, balance tin.

26. The alloy as defined in claim 24 wherein the same is molybdenum-tin in the range of 5 to 10% molybdenum, balance tin.

27. A method for preparing a coating, film or layer as defined in claim 1, consisting essentially of: admixing a first particulate of tin, lead, indium, or alloys of each of the foregoing, with a finely divided second particulate of a carbide former or carbonyl former in the form of their metals, to form with each other, an admixture in a vehicle suitable therefor to form a dispersoid of said admixture for dispersion on said base or substrate, reacting in presence of carbon monoxide said admixture up to and at the melting point of said admixture, cooling said melted admixture in the presence of said carbon monoxide atmosphere or carbon monoxide in an admixture with an inert gas or cooling in an inert atmosphere of hydrogen or hydrogen and nitrogen or nitrogen, and recovering said admixture as an "active" alloy.

28. The method as defined in claim 27, wherein the first and second particulates are in an admixture with each other and said particulates are in a size range from colloidal, 350 mesh (U.S.) to $\frac{1}{8}$ inch.

29. The method as defined in claim 27, wherein the vehicle is a rosin, oil, a Freon composition or a like vehicle and the dispersion is applied by silk screening, painting, spraying or printing on said substrate or base.

* * * * *